United States Patent
Rune et al.

(10) Patent No.: US 8,665,780 B2
(45) Date of Patent: Mar. 4, 2014

(54) ARRANGEMENTS AND METHOD FOR HANDLING MACRO DIVERSITY IN UTRAN TRANSPORT NETWORK

(75) Inventors: Johan Rune, Lidingö (SE); Lars Westberg, Enköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1428 days.

(21) Appl. No.: 10/583,958

(22) PCT Filed: Dec. 22, 2003

(86) PCT No.: PCT/SE03/02051
§ 371 (c)(1),
(2), (4) Date: Jun. 21, 2006

(87) PCT Pub. No.: WO2005/062636
PCT Pub. Date: Jul. 7, 2005

(65) Prior Publication Data
US 2007/0086457 A1    Apr. 19, 2007

(51) Int. Cl.
*H04W 4/00* (2009.01)
(52) U.S. Cl.
USPC ............................................. 370/328
(58) Field of Classification Search
USPC ......... 370/328, 331, 400, 469, 342, 389, 402, 370/392, 352, 395.1; 455/522, 502, 436, 455/438, 456.2
See application file for complete search history.

(56) References Cited

U.S. PATENT DOCUMENTS

| | | | |
|---|---|---|---|
| 6,331,983 B1 * | 12/2001 | Haggerty et al. | 370/400 |
| 2002/0126664 A1 * | 9/2002 | Kiiski et al. | 370/389 |
| 2003/0161284 A1 * | 8/2003 | Chen | 370/331 |
| 2005/0043045 A1 * | 2/2005 | Cheng et al. | 455/502 |

FOREIGN PATENT DOCUMENTS

| | | |
|---|---|---|
| EP | 1073297 A2 | 7/2000 |
| EP | 1404068 A2 | 3/2004 |
| WO | 03/049482 | 6/2003 |
| WO | 03/090417 | 10/2003 |

OTHER PUBLICATIONS

Chinese Office Action dated May 16, 2008 (17 pages).
Yuan Qi, "Study on IP multicast routing protocol", Telecommunications Network Technology, No. 1, Feb. 2001.

* cited by examiner

*Primary Examiner* — Kiet Doan
(74) *Attorney, Agent, or Firm* — Nixon & Vanderhye, P.C.

(57) ABSTRACT

The present invention relates to a router, computer program products and a method in a Universal Mobile Telecommunication System (UMTS). The router resides in an Internet Protocol (IP) based UMTS Terrestrial Radio Access Network (UTRAN) Transport Network. The UTRAN transport network carries Dedicated Channel (DCH) frames on DCHs between a RNC and at least one Node B, wherein the router comprises means for splitting one DCH traffic flow into at least two DCH traffic flows by using an IP multicast protocol.

40 Claims, 8 Drawing Sheets

ARRANGEMENTS AND METHOD FOR HANDLING MACRO DIVERSITY IN UTRAN TRANSPORT NETWORK

This application is the US national phase of international application PCT/SE2003/002051 filed 22 Dec. 2003, which designated the U.S., the entire content of which is hereby incorporated by reference.

TECHNICAL FIELD

The technical field relates to arrangements and method in a third generation mobile telecommunication system and evolved variants thereof. In particular, the technical field relates to arrangements and method for handling macro diversity in a UMTS Radio Access Network (UTRAN) transport network.

BACKGROUND

Third generation mobile communication systems (3G, Universal Mobile Telecommunications System (UMTS)) shall offer high quality voice and data services for mobile users. The systems shall also provide high capacity and universal coverage. In some situations that may however be difficult to fulfil, due to unreliable radio channels. One promising technique to combat link reliability problems over the radio interface is macro diversity techniques. Macro diversity should however also be seen as an inherent consequence of using CDMA as the multiple access technique in a cellular network. CDMA is an interference limited technology. That is, it is the interference in a cell that sets the upper limit for the cell's capacity. To keep the interference as low as possible it is essential that the base station controls the output power of the radio transmitters of the mobile terminals in the cell, i.e. fast and efficient power control is essential. As a mobile terminal moves towards the periphery of a cell it has to increase the power of its radio transmission in order for the base station to be able to receive the transmitted signal. Likewise, the base station has to increase the power of its radio transmission towards the mobile terminal. This power increase has a deteriorating effect on the capacity of both the mobile terminal's own cell and the neighbouring cell(s) which the mobile terminal is close to. Macro diversity is used to mitigate this effect. When the mobile terminal communicates via more than one base station, the quality of the communication can be maintained with a lower radio transmission power than when only a single base station is used. Thus, macro diversity is both a feature raising the quality of unreliable radio channels and a necessity that is required in order to overcome an inherent weakness of CDMA based cellular systems.

FIG. 1 illustrates a UTRAN. The Radio Network Controller (RNC) 102, 112, is connected to the Core Network 100, that in turn may be connected to another network. The RNC 102, is connected to one or more Node Bs 104, also denoted base stations via a transport network 106. The transport network 106 may e.g. be IP-based or ATM-based. The Node Bs 104 may be wirelessly connected to one or several User Equipments (UEs) 110 also denoted mobile terminals. A Serving-RNC (S-RNC) 112 is a RNC that has a Radio Resource Connection (RRC) connection with the UE 110. A Drift-RNC (D-RNC) 102 is a RNC that may be connected to a UE 110, but where another RNC 112, i.e. the S-RNC, handles the RRC connection with the UE 110.

Macro diversity enables a mobile station to communicate with a fixed network by more than one radio link, i.e. a mobile can send/receive information towards/from more than one radio port (or base station also denoted Node B). The radio ports (RPs) are spatially separated at distance from a short distance, e.g. between different floors in a building, (pico-cells) up to about some kilometers (micro- and macro-cells). As the propagation conditions between the mobile terminal and the different RPs, are different at the same moment in time, the resulting quality of the combination of the received signals is often better than the quality of each individual signal. Thus, macro diversity can improve radio link quality. When a mobile terminal is connected to more than one base station simultaneously, the UE is said to be in soft handover.

Macro diversity is applicable only to dedicated channels (DCH). Currently all the macro diversity functionality resides in the RNC provided that the corresponding functionality for softer handover in Node B is not considered. In the downlink, the splitting is performed in the RNC, which ensures that a copy of each downlink DCH FP frame is sent through each leg in the active set of the concerned DCH. Both DCH FP data frames and DCH FP control frames are subject to the splitting function.

In the uplink, the RNC performs the combination, which is more complicated than, the splitting. Only DCH FP data frames are subject to the combination procedure. DCH FP control frames are not combined, since each uplink DCH FP control frame includes control data that is specific for an individual Node B. For the uplink, the RNC has a time window in which all legs are expected to deliver their contribution to the combination (i.e a DCH FP frame with a certain Connection Frame Number (CFN)). At the expiration of the time window, all the DCH FP frames with the correct CFN that were received within the time window are passed to the combination function.

The actual combination is a selection of the best piece of data out of the candidates that were received through the different legs. For non-voice DCHs, the unit of selection is a transport block (TB). To determine which of the candidates to select for a certain transport block, the CRCI for the concerned TB is checked in each of the delivered frames. If one and only one of them indicates that the TB was correctly received at the Node B (i.e. that the CRC check was successful for the concerned TB when it was received by the Node B), this TB is selected. Otherwise, if more than one of the CRCIs indicate successful CRC check, the combination function selects the one of these TBs that belongs to the frame with the greatest Quality Estimate (QE) parameter. Likewise, if all of the CRCIs indicate unsuccessful CRC check, the combination function selects the TB from the frame with the greatest QE parameter. If in the two latter cases, the greatest QE parameter value is found in two or more of the frames (i.e. if these QE parameters are equal too), the selection of TB is implementation dependent. FIG. 2 illustrates the combination procedure for non-voice DCHs.

For voice DCHs, the combination works slightly differently. The Adaptive Multi Rate (AMR) speech codec produces three subflows, wherein each are transported in a respective DCH. These three DCHs are so-called coordinated DCHs. The coordinated DCHs are included in the same DCH FP frame and there is only one TB for each subflow in a frame. During the combination, the combination function does not select separate TBs from different candidates frames to create a new combined frame as described above in the context of non-voice DCHs. Instead it selects one entire frame based on the CRCI for the TB associated with subflow 1, which is the most significant subflow. The CRCI of the other subflows are insignificant, since these subflows are not CRC protected over the radio interface. Again, if the CRCIs indicated unsuccessful CRC check or because all of the concerned CRCIs indicate unsuccessful CRC check, the frame with the greatest QE parameter is selected. FIG. 3 illustrates the combination procedure for voice DCHs.

Hence macro diversity in current UTRANs is realised through macro diversity functionality, also denoted as Diversity Handover (DHO) functionality in the RNCs. The current standards allow DHO functionality in both the Serving RNC (S-RNC) and the D-RNC, but the possibility to locate the DHO functionality in the D-RNC is commonly not used.

Thus, a problem in the existing macro diversity solutions is that the split downlink flows and the uncombined uplink flows of user data are transported all the way between the RNC and the Node B. That results in that costly transmission resources are consumed in the UTRAN transport network, which also results in significant costs for the operators.

SUMMARY

It is proposed to distribute macro diversity functionalities to the routers. The router in an Internet Protocol (IP) based UMTS Terrestrial Radio Access Network (UTRAN) Transport Network within a Universal Mobile Telecommunication System, wherein the UTRAN transport network carries Dedicated Channel (DCH) frames on DCHs between a RNC and at least one Node B comprising means for splitting one DCH traffic flow into at least two DCH traffic flows by using an IP multicast protocol makes it possible to reduce required transmission resources.

An example method in an Internet Protocol (IP) based UMTS Terrestrial Radio Access Network (UTRAN) Transport Network within a Universal Mobile Telecommunication System, wherein the UTRAN transport network carries Dedicated Channel (DCH) frames on DCHs between a RNC and at least one Node B, comprises splitting one DCH traffic flow into at least two DCH traffic flows by using an IP multicast protocol makes it possible to reduce required transmission resources.

A computer program product that is directly loadable into the internal memory of a computer within a node in a Universal Mobile Telecommunication System, comprises a software code portions for performing said method which makes it possible to reduce required transmission resources.

The computer program product that is stored on a computer usable medium, comprises a readable program for causing a computer, within a node in a Universal Mobile Telecommunication System to control an execution of said method which makes it possible to reduce required transmission resources.

One important advantage achieved is transmission savings in the UTRAN transport network, which translate into significant cost savings for the operator. The transmission savings are realised through optimised location the DHO functionality. Thereby the redundant data transport is eliminated in the parts of the path, where data pertaining to different macro diversity legs of the same DCH would otherwise be transported in parallel along the same route.

Another advantage is that it facilitates that RNCs be located in more central locations of the network (i.e. with less geographical distribution). The main purpose of the current common geographical distribution of RNCs is to limit the transmission costs for the parallel macro diversity legs. When this parallel data transport is eliminated, it becomes more beneficial for an operator to centralise the RNCs, e.g. by co-locating them with MSCs or MGWs. Co-locating several nodes on the same site results in simplified operation and maintenance, which also means reduced costs for the operator.

DETAILED DESCRIPTION

Figure 1:
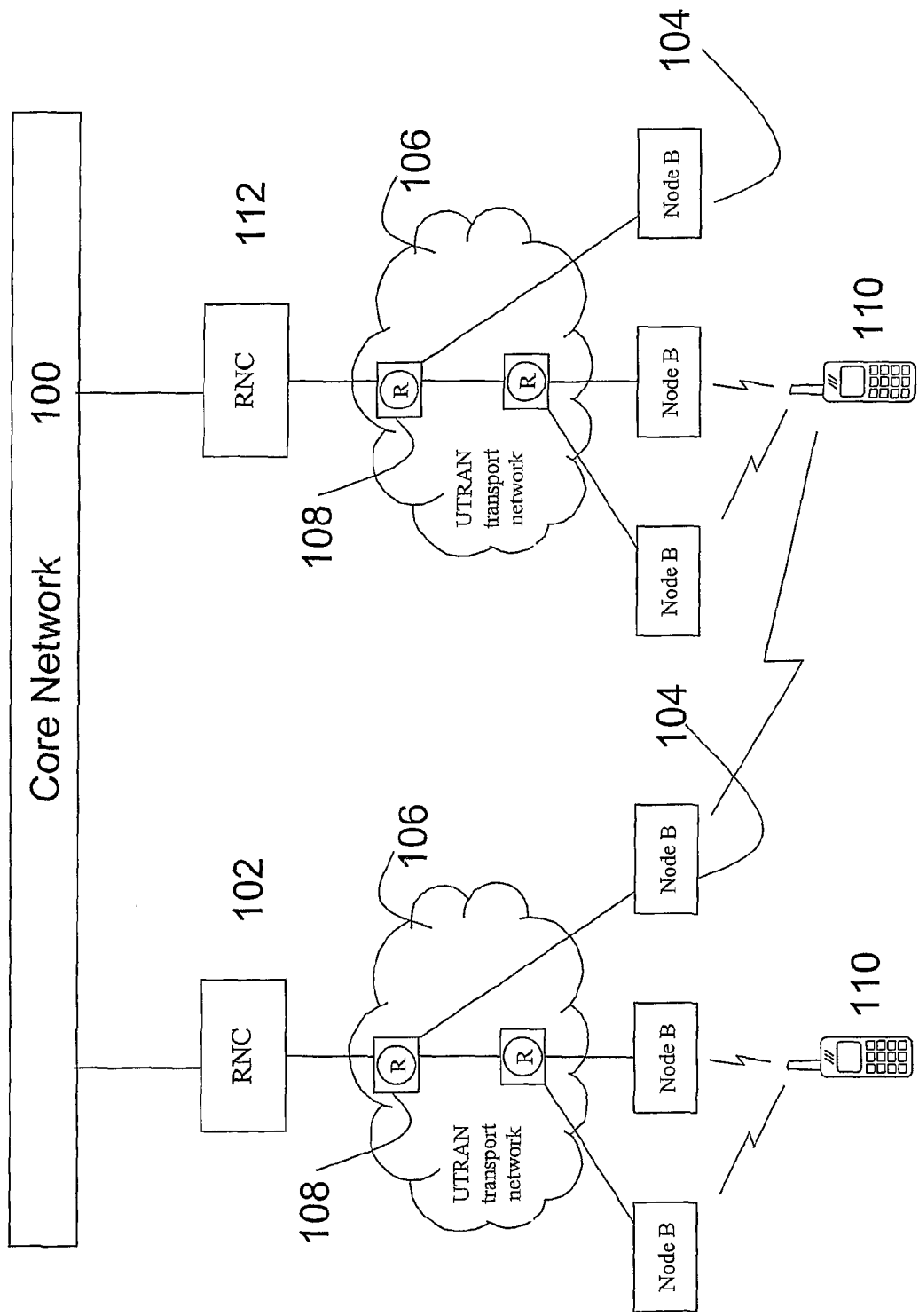
FIG. 1 is a schematic illustration of a UMTS Terrestrial Radio Access Network.
Figure 2:
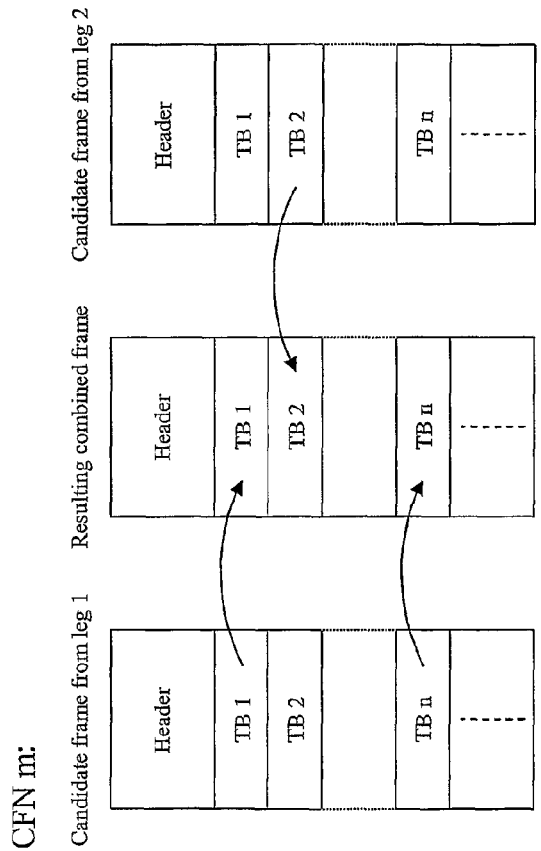
FIG. 2 illustrates schematically the combination procedure for non-voice DCHs.
Figure 2:
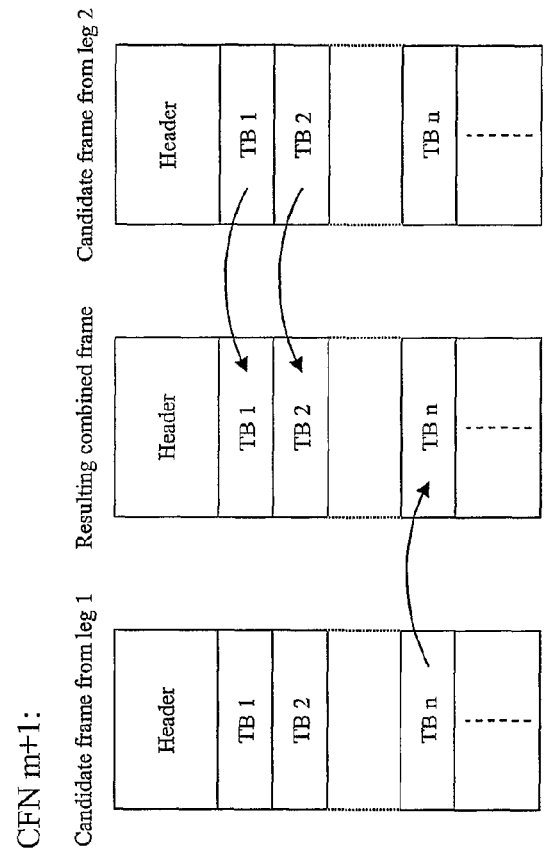
Figure 3:
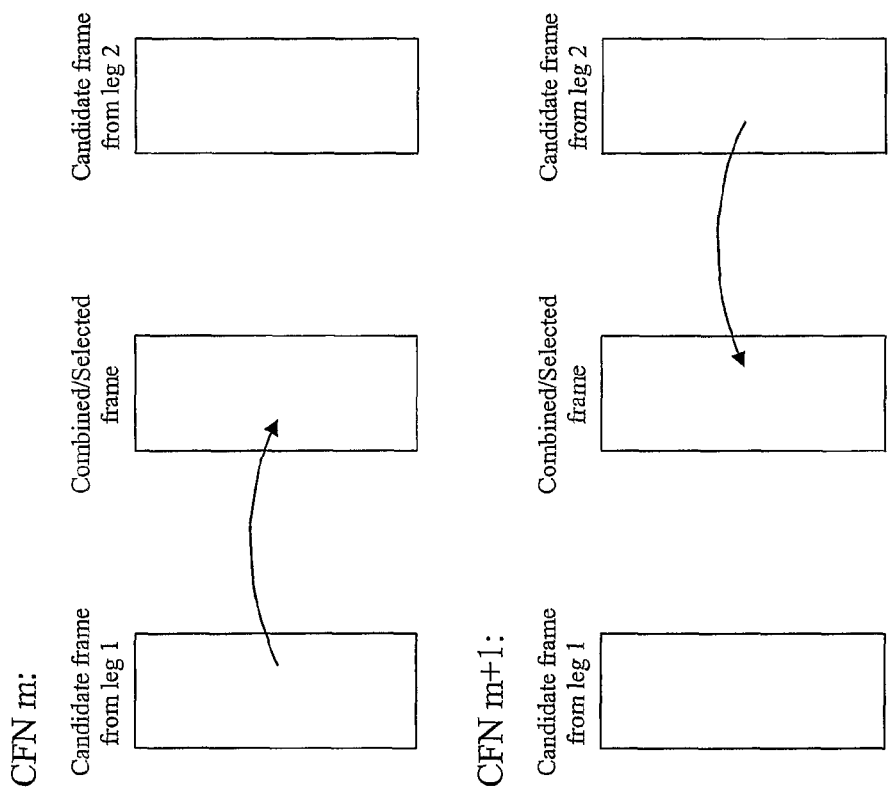
FIG. 3 illustrates schematically the combination procedure for voice DCHs.

The technology will now be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

One or more embodiments may be implemented in a UTRAN having an Internet Protocol (IP)-based transport network as illustrated in FIG. 1. The IP based transport network may be controlled by an IP of version 4, 6 or future versions.

Figure 4:
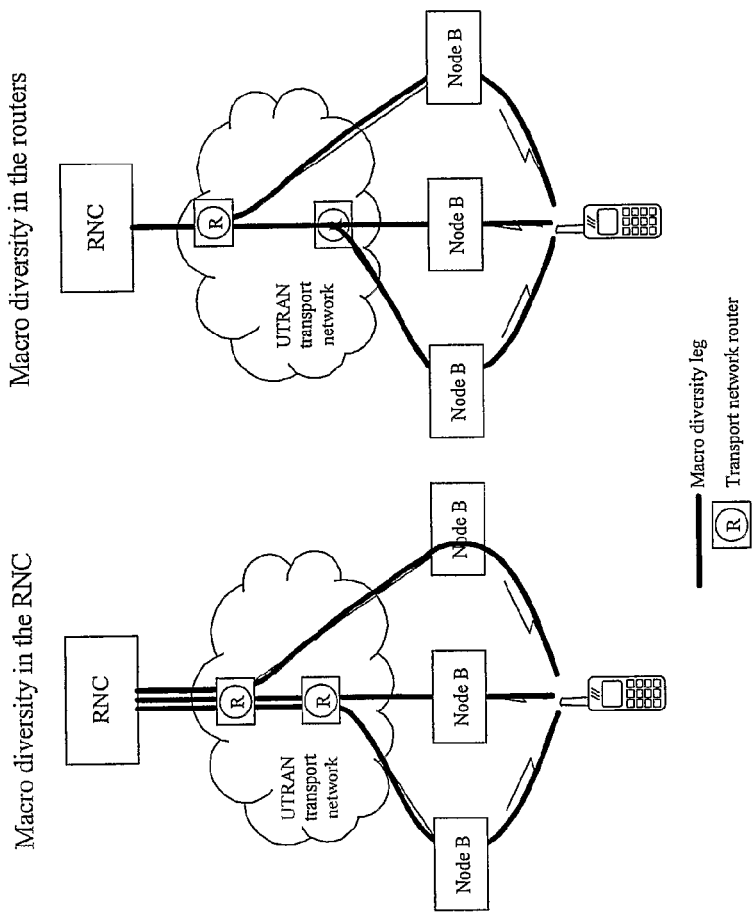
FIG. 4 illustrates schematically potential transmission savings in a network according to an embodiment of the present invention.

In order to reduce the required transmission resources, it is proposed to distribute the macro diversity functionality to the routers of the UTRAN transport network from the RNCs. When the routers handle the macro diversity, the splitting and combining of the traffics flows may be performed in any router in the transport network. However, it is advantageous to select a transport network router closer to the Node Bs than the RNC. That reduces redundant data paths and save transmission resources, as illustrated in FIG. 4. In this example, the D-RNC is not included in the path of the traffic flow, although it is involved (when applicable) in the Radio Network Subsystem Application Part (RNSAP) and Node B Application Part (NBAP) signalling when the Dedicated Channel (DCH) is established.

As mentioned above, a macro diversity handling router, is required to be able to perform a splitting of a downlink DCH traffic flow into at least two downlink DCH traffic flows and a combining of at least two uplink DCH traffic flows into one single DCH traffic flow. This is described in further detail below.

Downlink Splitting

The macro diversity arrangement residing in a UTRAN transport network router comprises a splitting unit. The splitting unit comprises means for splitting a downlink traffic flow, wherein IP multicast is used for the splitting. That implies that one or more routers in the IP based transport network should be capable of multicasting. Each DCH gets its own multicast tree which is established on demand. The inherent multicast capabilities of the transport network e.g. the Transport Network Layer (TNL) functionality, are used to enable optimised splitting, from a transmission point of view. The downlink connection should be a multicast connection. The RNC is then only required to send a single copy of each DCH FP frame in the downlink connection instead of one for each macro diversity leg as in the prior art. The splitting router performs the splitting by replicating the single copy of each DCH FP frame and transmits the replicated DCH FP frames according to a multicast protocol.

Several multicast routing protocols intended to be used in conjunction with current and future versions of the Internet Protocol may be used. The multicast routing protocols should build multicast trees through which multicast packets are forwarded. Examples of possible multicast routing protocols are Protocol Independent Multicast-Sparse Mode (PIM-SM), Core Based Trees Multicast Routing version 2 (CBTv2), Distance Vector Multicast Routing protocol version 3 (DVMRPv3) and Multicast Open Shortest Path First (MOSPF). In embodiments of the present invention, PIM-SIM and CBTv2 are preferred.

In the embodiment described below, the multicast routing protocol CBTv2 is used merely in order to simplify the description, however other multicast routing protocols as mentioned above may be used. A CBTv2 multicast tree originates at a "core router", i.e. at the RNC in the UTRAN, from which the tree fans out through the participating CBTv2 routers to the end hosts, i.e. the Node Bs. There may be many core routers in the network, each forwarding traffic to all or a part of the existing multicast groups.

An important component is the Multicast Listener Discovery (MLD) protocol for IPv6. The MLD protocol is used for discovering end hosts, i.e. Node Bs that listen to certain multicast addresses on a link. Thus, the MLD protocol may be used between the Node B and its adjacent router(s). It should be noted that the Internet Group Management Protocol (IGMP) version 1, 2 or 3, should be used instead of MLD in the case of IPv4.

When a DCH transport bearer is established, the RNC dynamically assigns a multicast destination address for the Node B in the downlink for this particular DCH. All RNCs in the UTRAN can be configured with non-overlapping ranges of multicast addresses. The assigned multicast address is selected from a range that has been configured for the concerned RNC. Each downlink DCH transport bearer will thus have its own dedicated multicast destination address in the Node B. The NBAP and the RNSAP, with modifications, may be used for assigning the multicast addresses. Thus the multicast address may be a new Information Element (IE) in messages such as Radio Link Setup Request, Radio Link Reconfiguration Request and Radio Link Reconfiguration Prepare.

When additional legs, and consequently additional Node Bs, are added to the active set of a DCH, these Node Bs will be assigned the same multicast destination address for the downlink DCH transport bearer as the already established Node Bs in the active set.

Figure 5:
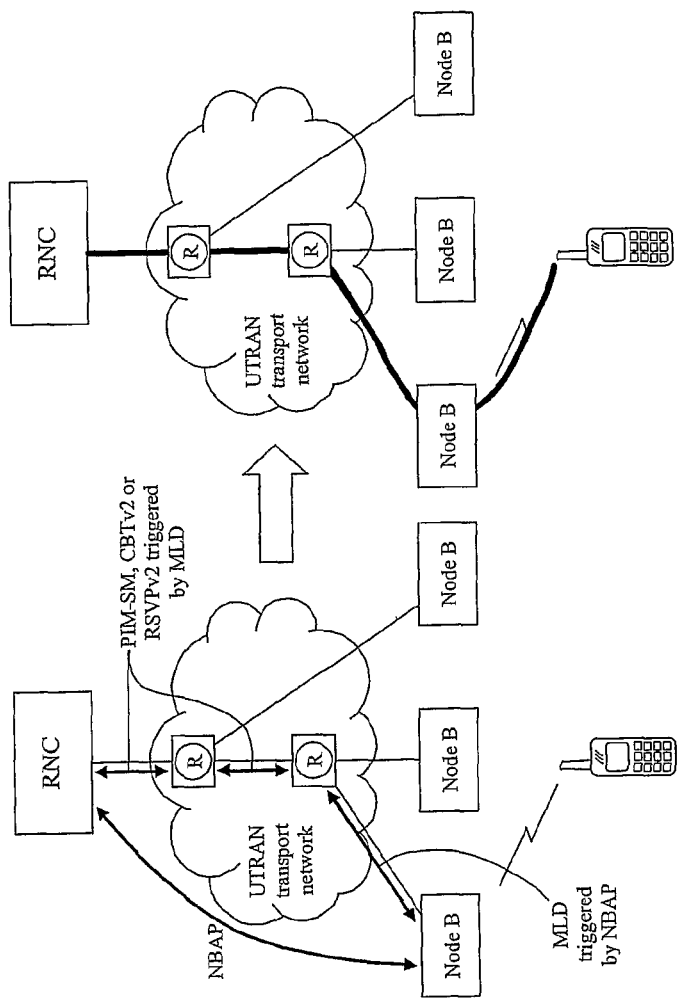
FIG. 5 and FIG. 6 illustrates schematically establishment of a first and second leg according to an embodiment of the present invention.
Figure 6:
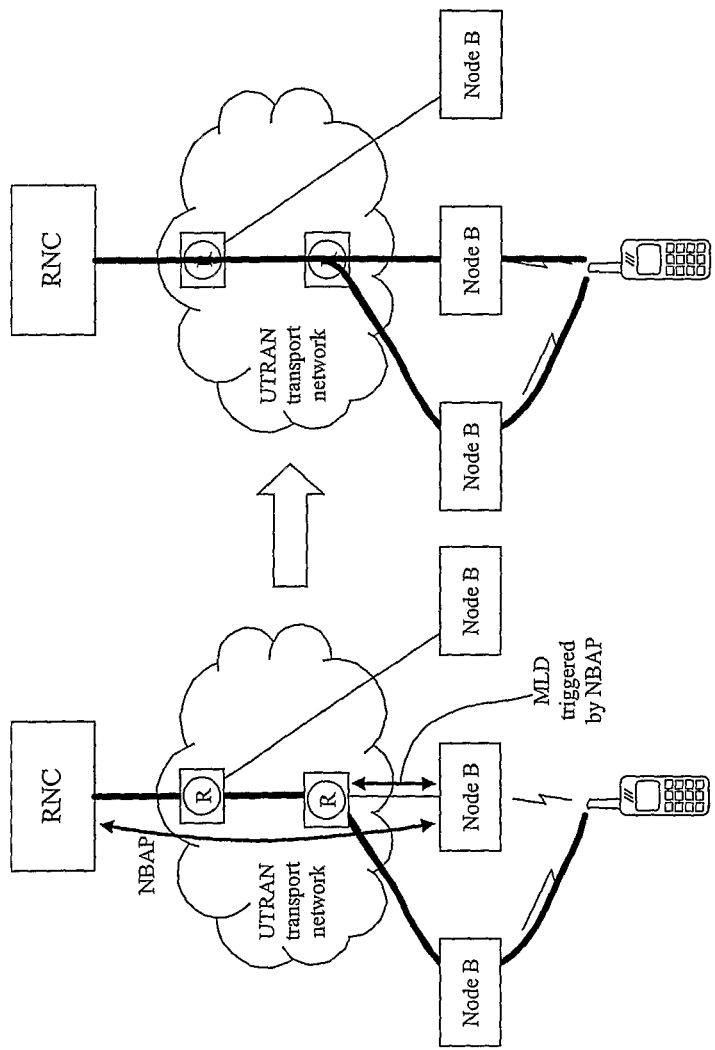

FIG. 5 illustrates establishment of a first leg. FIG. 6 illustrates establishment of a second leg, wherein the UE is in soft handover. Since the combining router is the first hop from Node B, the MLD or a corresponding protocol is sufficient. Thus, the multicast routing protocol is not required.

Once the multicast tree is established, the multicast forwarding capabilities of the router ensures that a copy of each downlink packet is delivered to each participating Node B.

The functionality of the multicast tree is dependent on that each router knows towards which core router, i.e. the RNC in UTRAN, to build the tree for a certain multicast address. This knowledge is used when a router receives a Multicast Listener Report indicating a certain multicast address. After this initial step the core router address, i.e. the RNC address is propagated through the tree by means of a message.

There are different ways to make the multicast capable routers aware of the mapping between the multicast addresses and the core routers. Three different ways are explained below. In one embodiment, CBTv2, or PIM-SM bootstrap mechanism is used, which automatically configures CBTv2, or PIM-SM, routers with the information required to map multicast addresses to core routers. In another embodiment, each router is manually configured with multicast address to RNC mapping information. In a further embodiment, NBAP may be modified such that the IP address of the S-RNC, which is the core router, is carried in the Radio Link Setup Request, Radio Link Reconfiguration Request or Radio Link Reconfiguration Prepare message to the Node B when a DCH is established. The Node B may then use the source filter feature of MLD version 3 to convey this core router address i.e. the S-RNC address to the router. In the Multicast Listener Report, the Node B indicates for the concerned multicast address that it is only interested in multicast packets that have the indicated RNC as the source. The router would then interpret this information as an indication of the RNC that is the core router for this multicast tree.

Thus, multicast is used for the downlink splitting. Each DCH gets its own multicast tree, which is established on demand. Through the Multicast Listener Discovery (MLD) protocol for IPv6 or the Internet Group Management Protocol (IGMP) version 1, 2 or 3 for IPv4 and either of a number of multicast routing protocols (e.g. PIM-SM or CBTv2) an optimal multicast tree, from a transmission point of view, is built. The downlink traffic is thus forwarded via this multicast tree. The splitting points are distributed optimally (from a transmission point of view) among the routers in the transport network. The procedure is depicted in FIGS. 5 and 6.

Uplink Combining

The macro diversity arrangement residing in a UTRAN transport network router comprises in accordance with one embodiment a combining unit. The combining unit comprises means for combining at least two uplink DCH traffic flows into one single uplink DCH traffic flow. However, the combining unit requires more complexity than the splitting unit. The combining function comprises the following:

a) means for detecting that a router is a splitting/combination point.

b) means for identifying the uplink flows that should be combined.

c) means for performing the actual combination of DCH FP frames.

d) means for managing a timing scheme required to prevent a combining router from waiting an indefinite time period for an outstanding frame Identifying a Splitting/Combination Point Provided that the multicast routing protocol uses the reverse path forwarding principle in the multicast tree building process, which both CBTv2 and PIM-SM do, a router being a splitting point in the downlink multicast tree, i.e. comprising a splitting unit, is also a combination point for the uplink unicast flows, i.e. comprising a combination unit. Thus if a router comprises means for detecting that it is a splitting point, it comprises automatically means for detecting that it is a combination point.

A splitting point is characterised by the fact that there is more than one listener in the downlink direction. By means of functionality of CBTv2 and MLD, a router is able to keep track of joining and leaving nodes and thereby able to determine the number of listeners it has for a specific multicast address. The MLD protocol may in some cases require a modification in order to be able to determine the correct number of listeners. The cases when the modification is required are when multiple Node Bs are connected to the same router via a common multi-access link, e.g. an Ethernet link. In this situation the listener report suppression mechanism of MLD must be eliminated or disabled. Otherwise a Node B would not send a planned listener report to the router, if another Node B on the same link has recently sent a listener report for the same multicast group. The result would be that the router would not know the number of listeners for the multicast group on the link.

Thus, the identification of the splitting/combination is performed by the MLD protocol if the splitting/combination router is next to the Node B. Otherwise, a multicast routing protocol is required.

Identifying Uplink Traffic Flows

In order to combine two or more legs in the uplink, a router can include means for identifying the uplink flows that corresponds to a certain downlink multicast tree. In an embodiment, the multicast address assigned as the downlink destination address is used also as the source address of the packets sent in the uplink from all participating Node Bs. Thus, the RNC assigns the unique multicast destination address for each DCH downlink as described above. If all participating Node Bs use this multicast address as source address for the corresponding uplink, the UTRAN transport network router is then able to identify packets belonging to different uplink flows. This method is simple, but it requires however that IPv6 routers are modified, since the current IPv6 standard discards packets having a multicast address as the source address. The situation is similar for IPv4 and IPv4 routers.

When the DCH FP control frames of the Node Synchronisation procedure are sent on the same transport bearers as the corresponding data DCH FP frames, the RNC identifies from which Node B a received DCH FP control frame originates. The type of frames for which this is relevant is limited to uplink node synchronisation control frames. In current UTRANs, where the transport bearer of each macro diversity leg is terminated in the RNC, the identity of the originating node B is implicitly indicated by the transport bearer on which the frame was received. However, when the DHO functionality is distributed according to one or more embodiments of the present invention, this method cannot be used. Instead, another method that may be used for identifying the originating Node B, is that the RNC assigns a destination address and a destination port to be used in the uplink using parameters which are already specified in NBAP, in addition to assigning the multicast address when the DCH is established. The normal behaviour would be to assign the same destination address, but a unique destination port for each leg in the active set of a DCH uplink. However, it would also be possible to assign the same destination port to all legs. One reason to choose the latter approach is to reduce the risk that the port numbers become a limiting resource in very large RNCs.

With a unique destination port per uplink leg identification of the originating Node B for uplink control frames (which are not combined) is implicit in the port at which a frame arrives. Thus the identification of the originating Node B of an uplink DCH frame is based on a destination IP address and a destination UDP port assigned by the RNC to the Node B for the uplink of the DCH. It is assumed that this is the preferred behaviour.

However, if it were preferred to use the same uplink destination port for all legs, the originating Node B can only be identified by the source data in the IP and UDP headers, if the same uplink destination port is used for all the legs. Since the source address is the same for all legs, only the source port remains as a distinguishing indicator. To ensure that the source ports of all the legs are different, they should be assigned by the RNC. This would be performed via NBAP as each leg is established. Thus the identification of the originating Node B of an uplink DCH frame is based on a source UDP port assigned by the RNC to the Node B for the uplink of the DCH.

It should also be noted that it is not required to perform the node synchronisation procedure via the transport bearer that carries the DCH user plane data. It is also possible to send the node synchronisation frames on another high priority transport bearer in order to achieve a high accuracy in the measurement. As long as this principle is kept and regular unicast connections are used for the node synchronisation frames, the problem of identifying the origin of the uplink DCH FP frames is eliminated. Thus, in such case it would be possible to use the same destination address and destination port as well as the same source address and source port in the uplink for all legs of a certain DCH.

A second method for identifying the uplink flows is to retrieve the destination address and the destination port(s) of the uplink flows from the RNC. The destination address is already known to the router, since the destination address is the core router of the downlink multicast tree, but the destination port information should be explicitly signalled from the router. This information may be included when the frame format information is transferred to the router.

If all the legs use the same uplink destination ports, this is all that is necessary. However, if the legs use different uplink destination ports, transferring the port information together with the frame format information would not be sufficient. In such case, a combining router should retrieve the port information from the RNC every time a new branch in the multicast tree is added to the router.

Identification of the originating Node B is not an issue when this method is used. If different uplink destination port numbers are used for the different legs, the originating Node B is implicit in the destination port number, at least for the control frames. Otherwise, if the same uplink destination port is used for all legs, the originating Node B is explicitly indicated by the source address of the uplink packets (since each Node B uses a unique source address in this method). However, using a separate unicast transport bearer for node synchronisation control frames eliminates the need for identification of the originating Node B.

In accordance with a further embodiment, a third method of identifying the uplink flows is to use an uplink flow identity implicit in the downlink flow. By using this method, it is possible for a combining router to identify the uplink flows through the uplink destination address and destination UDP port without explicit signalling from the RNC. In order for this to work the RNC should assign the same uplink destination address and port to all the Node Bs in the active set and this address-port pair must be the same as the source address-port pair used in the downlink. Then a combining router is adapted to retrieve the uplink destination address and port by looking at the source address and port of a downlink packet. Since a common uplink destination port for all legs is required in this method, identification of the originating Node B should be based on the uplink source address. However, using separate unicast transport bearer for node synchronisation control frames eliminates the need for identification of the originating Node B.

In accordance with a further embodiment, a fourth method of identifying the uplink flows is to modify the MLD (or IGMP) protocol and the multicast routing protocol such that the destination port of the uplink is included in the messages that are used to build the multicast tree (e.g. the Multicast Listener Report messages of the MLD protocol and the JOIN_ REQUEST messages of CBTv2).

The second, third and fourth methods above are both based on the UDP port numbers of the uplink packets. Furthermore, the second, third and fourth methods are either more complex or less efficient, but they do not violate any IP principles. However, the uplink flows may also be identified by means of other methods known by a person skilled in the art.

Actual Combining

When a router has detected that it is a combination point, it should initiate selective combining of the concerned uplink flows, preferably immediately. The principle of the actual combining is similar in some aspects to the actual combining performed in the conventional RNC. The main difference is that the combining router performs the combining instead of the RNC. The combining procedure differs for non-voice DCHs and voice DCHs.

If the DCH for which the router has detected that it is a combination point, is a non-voice DCH, the router retrieves frame format information from the RNC before it initiates the combination. This is because the unit of selection for non-voice DCHs is a TB, which represents only a fraction of a DCH FP frame and thus only a fraction of a UDP packet as described above. The TBs are described by the Transport Format Indicator (TFI) in each frame.

To retrieve the format information the router contacts the RNC of the downlink multicast tree using a new application level protocol. An application level protocol is a protocol running above the transport level in the protocol stack, i.e. above a transport protocol such as User Datagram Protocol (UDP), Transmission Control Protocol (TCP) or Stream Control Transmission Protocol (SCTP). An example of an application level protocol is HyperText Transfer Protocol (HTTP), but the application level protocols comprise several protocols. The information that is required in order to perform the combination by the router is the TFIs that will be used for the DCH and how each of them maps to the number of TBs and the TB size (or the TB set size). The TFIs are not preconfigured in the routers, since the interpretation of a TFI is dynamic, and may possibly vary from DCH to DCH. The TFI is signalled from the RNC to a Node B via NBAP. The Transmission Time Interval (TTI) for the DCH may also be useful for the timing algorithm, which is described further below, and thus a router may retrieve the TTI from the RNC together with the frame format information.

When the router retrieves the frame format information it is able to identify the individual TBs, their associated CRCIs and the QE parameter of each frame in the uplink flows. The router uses the ability to select TBs in a similar manner as the RNC currently does. The router checks the frame type indicator in the frame header, in order to avoid trying to combine control frames and the CFN to ensure that all received candidate frames have the same CFN value. To extract the frame type and the CFN is relatively simple since they have fixed positions in the frame header. The actual combining described above can be performed conventionally. A difference between is however, that the router builds a new frame and places the new frame in a new UDP packet and sends it towards the RNC.

The header of the new frame will be the same as in all the received candidate frames and the TBs and their CRCIs will be the selected ones. The combining router selects the best (greatest) of the Quality Estimate (QE) values of the candidate frames to be included in the QE field of the new frame. If the optional payload CRC is used the router calculates a new payload CRC for the new frame. The frame header consists of a header CRC, a frame type indicator, the CFN and transport format indicators. This header is not dependent on the quality of the data in the payload. Thus, the header can be same in all candidate frames. Candidate frames imply in this specification all the frames with the same CFN that in a sense are candidates for providing the best quality data to be selected in the combining procedure. Since the header is the same in all candidate frames, the header will also remain unchanged in the resulting combined frame. The payloads of the candidate frames, however, comprise Transport Blocks (TBs), whose quality may vary. The quality of a certain TB is indicated by its associated CRC Indicator (CRCI). The CRCI indicates whether a TB has passed the CRC check when it was received by the base station over the radio interface. In addition, the QE indicates the overall quality of the frame. The QE is measured in the base station, roughly corresponding to the period of time from which the contents of the frame originate. The QE value can be associated with the bit error rates. The TBs are selected individually from all the candidate frames. When a TB is selected from candidate frame X, the associated CRCI in frame X is also selected. Thus, the header of the combined frame is the same as of the candidate frames and the TBs of the candidate frame are the selected TBs.

In the prior art, the result of the combining is not forwarded in a frame. Thus in prior art combining, no QE parameter is selected to be forwarded. However, in the combining according to an embodiment, a QE parameter is included in the combined frame. Thus a rule for how to select the QE parameter is provided. In a preferred embodiment, the best (greatest) QE parameter of the candidate frames is selected. The selection is based on that the quality of the combined frame will normally be better than the quality of the best of the candidate frames. Hence, it is reasonable that the QE parameter of the combined frame is at least as great as the greatest QE parameter of the candidate frames.

When the combined frame is built, the router includes the combined frame in the new UDP packet as described above. If the UDP source and/or destination ports are different for the different legs, as described above, and thus for different candidate frames, the router selects the source and destination ports from one of the received candidate frames. In a preferred embodiment it uses the same port numbers for all the new UDP packets in the flow, because this is an optimal way for the IP/UDP header compression. Subsequently, the router calculates a new UDP checksum before the UDP packet is sent to the RNC.

The combination procedure for voice DCHs is optimised compared to the case with non-voice DCHs. As long as the number of transport blocks is fixed in a voice DCH FP data frame, the router does not have to retrieve any frame format information from the RNC. The router also does not have to retrieve the TTI, which also is fixed and predictable, e.g. 20 ms, for voice DCHs. Thus no information has to be retrieved from the RNC. The required knowledge about the TTI and the frame format for voice DCHs may be preconfigured in the router.

In a frame with a fixed number of transport blocks, e.g. three i.e. one for each sub-flow, the parameters that the selection is based on, i.e. the CRCI for the transport block sub flow 1 and the QE parameter, are located in fixed positions relative to the end of the frame, and therefore easily extractable, provided that the optional payload CRC either is consistently never or always used, never is however preferred.

A second optimisation for the procedure with voice DCHs compared with non voice DCHs is that the router does not have to build a new frame and a new UDP packet. This is because the unit of selection is the entire frame, which corresponds to an entire UDP packet. Thus, the router according to one embodiment comprises means for detecting that it is a combination point, identifying the uplink flows, performing the selection and sending the selected UDP packet (i.e. the selected frame) entirely without contact with the RNC when the combined DCH is a voice DCH. If the source and destination ports are not the same for all legs, a possible optimisation may be to allow the router change the port numbers in the UDP header of the selected packet and recalculate the UDP checksum, so that all the selected UDP packets get the same source and destination ports. From an IP/UDP header compression perspective, this is preferred since it is more optimal than varying port numbers.

In order to make the combining router independent of the RNC, the combining router can include means for distinguishing between a voice DCH and a non-voice DCH. A simple way to indicate the DCH type is to use dedicated uplink multicast source addresses, which are equal to the downlink destination multicast address for voice DCHs. E.g., voice DCHs may use odd multicast source addresses while other DCHs use even multicast addresses. Still another way according to another embodiment of the present invention is to use dedicated uplink destination or source ports, e.g. odd numbered ports for voice DCHs and even numbered ports for other DCHs. It is also possible to use the downlink destination port, one default port for voice and one default port for non-voice according to a further embodiment of the present invention. However, in this case the router would wait for the first downlink packet in order to determine the type of the DCH.

Since the actual combining of voice DCHs is less complex than the combining of non voice DCHs, according to one embodiment the routers may only be able to perform the uplink combining for the voice DCHs, and the non voice DCHs are combined in the RNC in accordance with prior art.

Timing Scheme for the Uplink Frame Combining

The timing of the frame combining is associated with the problem of knowing how long to wait for outstanding candidate frames to arrive. The shorter waiting time, the greater is the risk that a late arriving candidate frame is missed. On the other hand, if the waiting time is too long, the resulting combined frame may arrive too late at the RNC or at a later combination point. It should be noted that the RNC and the Node B are synchronised by means of previously defined procedures, but these synchronisation procedures do not include the transport network routers.

The difficulties with the timing of the combination originates from that the routers are not synchronised with the Node Bs and the RNCs. A consequence of this is that the combining router is not able to easily define a time of arrival window for the frames to be combined. The trigger point should be the first of the candidate frames that arrive. The router then waits for the remaining candidate frame(s) to arrive from the other leg(s). When the combination is performed in the RNC as in the prior art, the RNC waits until the end of the TTI, but the router does not have any such reference timing.

Preferably, the last candidate frame arrives while the router is waiting, the router combines the frames and sends the result. However, the problem arises when one (or more) of the frames does not arrive at all. The router should have a maximum waiting time defined. Even though it is quite possible to define a maximum waiting time to be e.g. one third of the minimum TTI, that waiting time not very useful. Such waiting time increases the maximum delay of the transport network. The delay variation also increases, unless the router always waits until the maximum waiting time has expired, even when all the candidate frames have arrived.

To let the router wait until the maximum waiting time has expired before it sends the only candidate frame that it received, assuming that the router is a two-leg combination point has drawbacks. If there is a second combination point further along the uplink, the frame may arrive too late for that combination. The second combining router may then preferably discard the late frame but it may also forward the late frame. If the second combination router forwards the frame, the RNC will receive two frames with identical CFN, when it is only expected to receive one frame. The RNC can then either combine the two frames or discard the one that is last received.

The frame may also be delayed so much that it arrives too late for the RNC to process it, i.e. after the end of the concerned TTI. To avoid this, the RNC may be able to extend its time of arrival window by delaying its end point, but that would result in an increased delay.

One way to overcome the above stated problem is to allow the combining router define an adaptive latest accepted time of arrival (LAToA) for a set of frames to be combined, i.e. the expected frames with a certain Connection Frame Number (CFN). One purpose is to adapt the LAToA to the maximum transport delay that a frame is allowed to experience on its path from the Node B to the combining router, assuming that this transport delay very seldom exceeds the maximum allowed transport delay as stipulated by standard requirements. In order to be able to define a reasonable LAToA, the combination router is preferred to be aware of the TTI for the connection. The TTI is retrieved from the RNC together with the required information about the DCH FP frame formats as described above. For voice DCHs, the TTI may be preconfigured in the router, similar to the frame format, since the TTI always is 20 ms for voice DCHs.

In general, the router uses the TTI to estimate the LAToA for the next set of frames to be combined, i.e. a set of frames with a certain CFN, based on the times of arrival of the previous set of frames, i.e. the frames with the previous CFN. The estimates are adjusted for each new CFN.

In the following description of the combination timing scheme, the CFNs are numbered CFN0, CFN1, CFN2, . . . CFNn, CFNn+1, . . . . Parameters corresponding to the CFNs have the corresponding indexes.

In general, if all the candidate frames for CFNn arrive before LAToAn, the router combines them and sends the result without waiting until LAToAn. If not all candidate frames for CFNn have arrived at LAToAn, the router combines the candidate frames that it has received and sends the result. If only one candidate frame is received, that frame will be forwarded unchanged. If no frame is received, nothing is sent.

When the first uplink frame that is subject for combination arrives at time $t_0$, the router sets the LAToA for the CFN, CFN0, of the received frame to $t_0+\Delta$ (this LAToA is denoted $LAToA_0$, i.e. $LAToA_0=t_0+\Delta$), where $\Delta$ is a fraction of the TTI.

The below stated general rules for subsequent CFNs are divided into two different cases:

1. All candidate frames for $CFN_n$ arrive before $LAToA_n$.

In this case, if the time of arrival of the last combined frame for $CFN_n$, $ToAoLCF_n$, was later than, or equal to, $LAToA_n-\Delta$, i.e. $LAToA_n-\Delta \leq ToAoLCF_n \leq LAToA_n$, then $LAToA_{n+1}$ is set to $LAToA_{n+1}=ToAoLCF_n+TTI+\Delta$. Otherwise, if the last combined frame arrived before $LAToA_n-\Delta$, i.e. $ToAoLCF_n<LAToA_n-\Delta$, $LAToA_{n+1}$ is set to $LAToA_{n+1}=LAToA_n+TTI-\delta$, where $\delta$ is a fraction of $\Delta$. According to another embodiment, an additional rule to this general rule is that if $LAToA-\Delta-\delta<ToAoLCF_n\leq LAToA-\Delta$, then $LAToA_{n+1}$ is set to $LAToA_{n+1}=LAToA_n+TTI$.

2. Not all candidate frames for $CFN_n$ arrive before $LAToA_n$.

Figure 7:
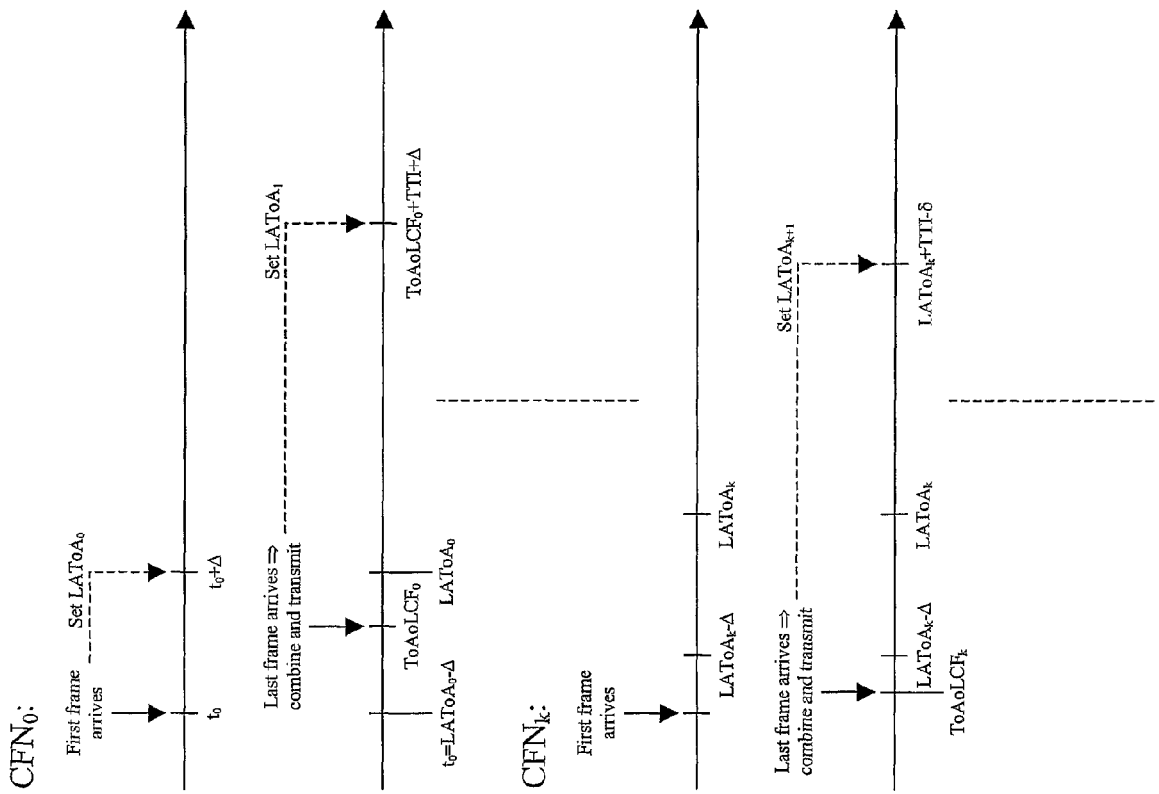
FIG. 7 and FIG. 8 illustrates schematically an example combining timing scheme.
Figure 8:
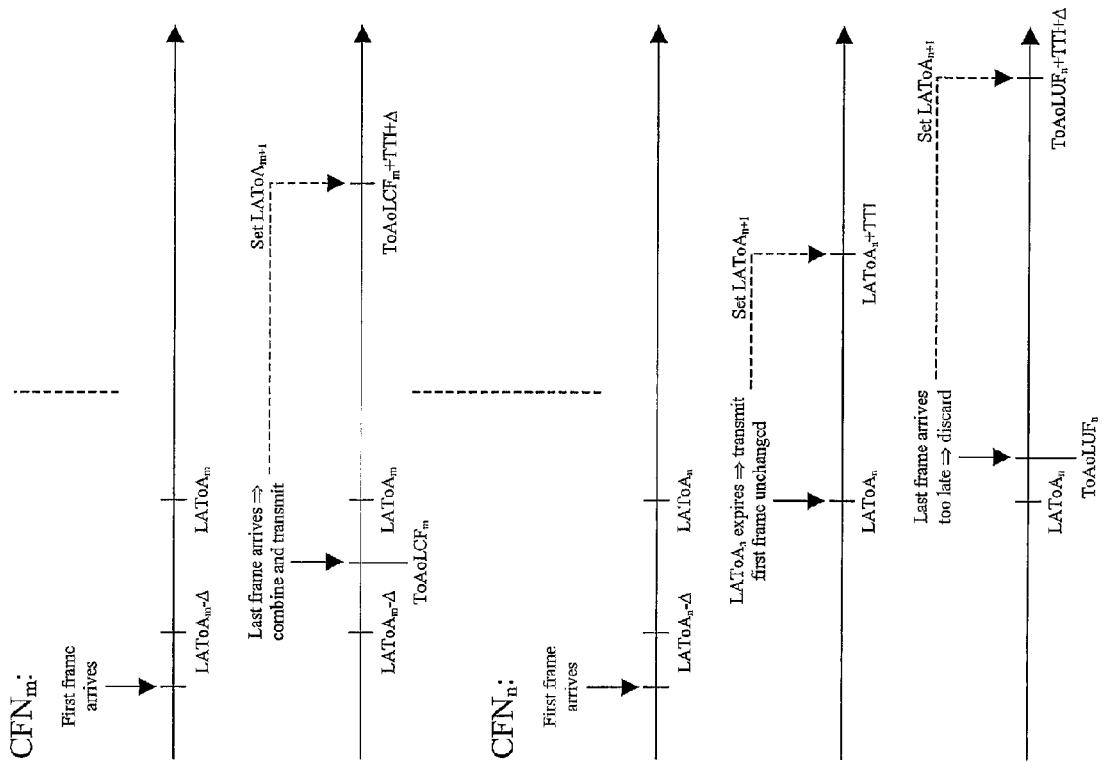

In the second case, when not all the candidate frames for $CFNn$ have arrived at $LATOA_n$, the router will set $LAToA_{n+1}$ based on the time of arrival of the last combined frame for $CFN_n$, $ToAoLCF_n$. If $ToALCF_n$ was later than, or equal to, $LAToA_n-\Delta$ (i.e. $LATOA_n-\Delta\leq ToALCF_n\leq LAToA_n$), then $LAToA_{n+1}$ is set to $LAToA_{n+1}=ToAoLCF_n+TTI+\Delta$. Otherwise, if the last combined frame arrived before $LAToA_n-\Delta$ (i.e. $ToAoLCF_n<LAToA_n-\Delta$) or if no candidate frame at all was received, $LAToA_{n+1}$ is set to $LAToA_{n+1}=LAToA_n+TTI$. If subsequently a candidate frame for $CFN_n$ is received after $LATOA_n$ at the time of $ToALUF_n$ (i.e. time of arrival of late uncombined frame for $CFN_n$), $LAToA_{n+1}$ will be set to $LAToA_{n+1}=ToAoLUF_n+TTI+\Delta$. As for the treatment of the actual late uncombined frame, the router has two options: it could forward it unchanged or discard it. Preferably, the router should discard it in order to not waste bandwidth and not to confuse a possible second combining router further along the uplink. The described combining timing scheme is illustrated in FIGS. 7 and 8. An example of preferred values of $\Delta$ and $\delta$ are $\delta=10$ μs and $\Delta=250$ μs.

This scheme results in that the router adapts the LAToA to the maximum delay that a frame can experience on the path between the Node B and the combining router, whenever a frame arrives later than expected, the router adjusts the next LAToA. This is exactly what is desired assuming that no frames are subject to larger transport delays than the QoS of the bearer allows. To recover from abnormally delayed frames and to handle clock drifts, there is also a slow adaptation in the other direction (i.e. adjusting the next LAToA earlier in time) when all the candidate frames arrive early. $\delta$ is used for this purpose.

One way to avoid the timing problem is to ensure that the Node B always sends a frame even when there is no correctly received data to send even when silent mode and/or DTX is used. It would then use a TFI indicating TBs of zero length, or even more preferred, send a frame consisting of only the CFN. In the latter case, the resulting IP packet, with header compression applied, would consist of only five bytes. With this function in place a combining router could always wait for all the expected candidate frames to arrive before combining the frames instead of using a timing algorithm.

A disadvantage is that data, albeit small packets, is unnecessarily transmitted. This would occur even when the connection is not in a macro diversity mode, unless a signalling message is introduced to remotely turn this function on and off from the RNC. Even though the superfluous packets would very small, thanks to efficient header compression, it would still counteract the one of the purposes of the present invention to move macro diversity functionality to a router of the transport network. Another disadvantage is that if the rare event of a lost frame in the transport network occurs, the combining router will keep waiting for the lost frame and consequently all the frames with that CFN will be wasted.

Thus, the method in an IP based UTRAN Transport Network within a UMTS, wherein the UTRAN transport network carries Dedicated Channel (DCH) frames on DCHs between a RNC and at least one Node B, comprises:

splitting one DCH traffic flow into at least two DCH traffic flows by using an IP multicast protocol.

The method and thus functionality of the RNC and the routers used may be implemented by a computer program product. The computer program product is directly loadable into the internal memory of a computer within one or more nodes, e.g. a router or a server, in the mobile telecommunication network, comprising the software code portions for performing the steps of the method. The computer program product is further stored on a computer usable medium, comprising readable program for causing a computer, within a router, server, RNC or Node B in the mobile telecommunication network, to control an execution of the steps of the method.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A router in an Internet Protocol, IP, based UMTS Terrestrial Radio Access Network (UTRAN) Transport Network within a Universal Mobile Telecommunication System, the UTRAN transport network carrying Dedicated Channel (DCH) frames on DCHs between a RNC and at least one Node B, the router comprising:
    means for splitting one input downlink DCH traffic flow originating from the RNC into at least two output downlink DCH traffic flows by using an IP multicast protocol,
    wherein each output downlink DCH flow carries user data destined to a same end user equipment,
    wherein the router is separate from both the RNC and the Node Bs, and
    wherein the router is in a communication traffic path between the RNC and the at least one Node B.

2. The router according to claim 1, wherein the router comprises means for replicating each DCH frame of the input downlink DCH traffic flow into a corresponding DCH frame of each output downlink DCH traffic flow and means for transmitting the replicated DCH frames of all output downlink DCH traffic flows according to the IP multicast protocol.

3. The router according to claim 1, wherein the IP multicast protocol is a Core Based Trees Multicast Routing version 2 (CBTv2) protocol.

4. The router according to claim 1, wherein the IP multicast protocol is a Protocol Independent Multicast-Sparse Mode (PIM-SM) protocol.

5. The router according to claim 1, wherein each output downlink DCH traffic flow is assigned a dedicated multicast destination address in the at least one Node B.

6. The router according to claim 5, wherein the means for splitting further comprises means for identifying a mapping between the RNC and the multicast destination address by using a CBTv2 or PIM-SM bootstrap mechanism.

7. The router according to claim 1, further comprising:
    means for determining whether the router is a splitting and/or combination router by using protocol(s) CBTv2 and/or MLD,
    wherein the protocol(s) are/is arranged to determine a number of listeners for a specific multicast destination address.

8. The router according to claim 1, further comprising:
    means for determining whether the router is a splitting and/or combination router by using protocol(s) PIM-SM and/or MLD,
    wherein the protocol(s) are/is arranged to determine a number of listeners for a specific multicast destination address.

9. The router according to claim 1, further comprising:
    means for determining whether the router is a splitting and/or combination router by using protocol(s) PIM-SM and/or Internet Group Management Protocol (IGMP), wherein the protocol(s) are/is arranged to determine a number of listeners for a specific multicast destination address.

10. The router according to claim 1, further comprising:
means for determining whether the router is a splitting and/or combination router by using protocol(s) CBTv2 and/or Internet Group Management Protocol (IGMP),
wherein the protocol(s) are/is arranged to determine a number of listeners for a specific multicast destination address.

11. The router according to claim 1, further comprising:
means for identifying DCH frames belonging to different uplink DCH traffic flows by means of utilization of a multicast address, assigned as a downlink destination address, as a source address of the DCH frames sent in the uplink DCH traffic flows from all participating Node Bs.

12. The router according to claim 1, further comprising:
means for identifying DCH frames belonging to different uplink DCH traffic flows by retrieving a destination address and destination port(s) of uplink flows from the RNC.

13. The router according to claim 1, further comprising:
means for identifying DCH frames belonging to different uplink DCH traffic flows by using an uplink flow identity implicit in a downlink DCH traffic flow.

14. The router according to claim 1, further comprising:
means for identifying DCH frames belonging to different uplink DCH traffic flows by modifying MLD or IGMP protocol and a multicast routing protocol such that a destination port of an uplink is included in messages that are used to build a multicast tree.

15. The router according to claim 1, further comprising:
means for combining at least two input uplink DCH traffic flows into one single output uplink DCH traffic flow,
wherein each input uplink DCH flow carries user data from the same user equipment.

16. The router according to claim 15, wherein the means for combining further comprises:
means for building a new DCH frame from a received set of DCH frames in the at least two input uplink DCH traffic flows to be combined;
means for encapsulating the new DCH frame in a UDP packet; and
means for sending the UDP packet in an uplink direction.

17. The router according to claim 16, wherein the means for building the new DCH frame from the received set of DCH frames to be combined further comprises:
means for including a selected set of Transport Blocks (TBs) in a payload of the new DCH frame;
means for copying a header of the received set of DCH frames to the new DCH frame; and
means for selecting a Quality Estimate (QE) value for the new DCH frame and, if a payload CRC is used, calculating a payload CRC for the new DCH frame.

18. The router according to claim 1, further comprising:
means for estimating a Latest Accepted Time of Arrival (LAToA) for a next set of DCH frames to be combined having a Connection Frame Number n (CFN n) based on times of arrival of previous set of frames having a CFN n−1; and
means for adjusting the estimates of the LAToA for each new frame adapted to a maximum transport delay that a frame can experience under normal circumstances on its path from the at least one Node B to the router.

19. A method in an Internet Protocol, IP, based UMTS Terrestrial Radio Access Network (UTRAN) Transport Network within a Universal Mobile Telecommunication System, the UTRAN transport network carrying Dedicated Channel (DCH) frames on DCHs between a RNC and at least one Node B, the method comprising:
splitting, within a router, one input downlink DCH traffic flow originating from the RNC into at least two output downlink DCH traffic flows by using an IP multicast protocol,
wherein each output downlink DCH flow carries user data destined to a same end user equipment,
wherein the router is separate from both the RNC and the Node Bs, and
wherein the router is in a communication traffic path between the RNC and the at least one Node B.

20. The method according to claim 19, further comprising:
replicating each DCH frame of the input downlink DCH traffic flow into a corresponding DCH frame of each output downlink DCH traffic flow; and
transmitting the replicated DCH frames of all output downlink DCH traffic flows according to the IP multicast protocol.

21. The method according to claim 19, wherein the IP multicast protocol is a Core Based Trees Multicast Routing version 2 (CBTv2) protocol.

22. The method according to claim 19, wherein the IP multicast protocol is a Protocol Independent Multicast-Sparse Mode (PIM-SM) protocol.

23. The method according to claim 19, wherein each output downlink DCH traffic flow is assigned a dedicated multicast destination address in the at least one Node B.

24. The method according to claim 19, further comprising:
identifying a mapping between the RNC and a multicast destination address by using a CBTv2 or PIM-SM bootstrap mechanism.

25. The method according to claim 19, further comprising:
determining whether the router is a splitting and/or combination router by using protocol(s) CBTv2 and/or MLD,
wherein the protocol(s) are/is arranged to determine a number of listeners for a specific multicast destination address.

26. The method according to claim 19, further comprising:
determining whether the router is a splitting and/or combination router by using the protocol(s) PIM-SM and/or MLD,
wherein the protocol(s) are/is arranged to determine a number of listeners for a specific multicast destination address.

27. The method according to claim 19, further comprising:
determining whether the router is a splitting and/or combination router by using the protocol(s) PIM-SM and/or Internet Group Management Protocol (IGMP),
wherein the protocol(s) are/is arranged to determine a number of listeners for a specific multicast destination address.

28. The method according to claim 19, further comprising:
determining whether the router is a splitting and/or combination router by using the protocol(s) CBTv2 and/or Internet Group Management Protocol (IGMP),
wherein the protocol(s) are/is arranged to determine a number of listeners for a specific multicast destination address.

29. The method according to claim 19, further comprising:
identifying DCH frames belonging to different uplink DCH traffic flows by means of a utilization of a multicast address, assigned as a downlink destination address, as a source address of the DCH frames sent in the uplink DCH traffic flows from all participating Node Bs.

30. The method according to claim 29, further comprising:
identifying an originating Node B of an uplink DCH frame, based on a destination IP address and a destination UDP port assigned by the RNC to the Node B for the uplink of the DCH.

31. The method according to claim 19, further comprising:
identifying DCH frames belonging to different uplink DCH traffic flows by retrieving the destination address and the destination port(s) of the uplink DCH traffic flows from the RNC.

32. The method according to claim 31, further comprising:
identifying an originating Node B of an uplink DCH frame, based on a source IF address.

33. The method according to claim 19, further comprising:
identifying DCH frames belonging to different uplink DCH traffic flows by using an uplink flow identity implicit in the downlink flow.

34. The method according to claim 19, further comprising:
identifying DCH frames belonging to different uplink DCH traffic flows by modifying MLD or IGMP protocol and a multicast routing protocol such that the destination port of the uplink is included in messages that are used to build a multicast tree.

35. The method according to claim 29, further comprising:
identifying an originating Node B of an uplink DCH frame, based on a source UDP port assigned by the RNC to the Node B for the uplink of the DCH.

36. The method according to claim 19, further comprising:
combining at least two input uplink DCH traffic flows into one output uplink DCH traffic flow, wherein each input uplink DCH flow carries user data from the same user equipment.

37. The method according to claim 36, further comprising:
building a new DCH frame from a received set of DCH frames in the at least two input uplink DCH traffic flows to be combined;
encapsulating the new DCH frame in a UDP packet; and
sending the UDP packet in an uplink direction.

38. The method according to claim 37, wherein the building step further comprises:
including a selected set of Transport Blocks, TBs, in the payload of the new DCH frame;
copying the header of the received set of DCH frames to the new DCH frame; and
selecting a Quality Estimate, QE, value for the new DCH frame and, if a payload CRC is used, calculating a payload CRC for the new DCH frame.

39. The method according to claim 19, further comprising:
estimating a Latest Accepted Time of Arrival (LAToA) for a next set of DCH frames to be combined having a Connection Frame Number n (CFN n) based on the times of arrival of the previous set of frames having a CFNn−1, and
adjusting the estimates of the LAToA for each new frame adapted to the maximum transport delay that a frame can experience under normal circumstances on its path from the Node B to the combining router.

40. A usable medium storing therein a program readable by a computer within a node in a Universal Mobile Telecommunication System, the program including executable instructions to cause the computer to execute the method of claim 19.

* * * * *